United States Patent [19]

Baumgarten

[11] Patent Number: 5,239,813
[45] Date of Patent: Aug. 31, 1993

[54] PROCESS AND APPARATUS FOR SHEATHING CABLES FORMED OF A PLURALITY OF CONDUCTORS TWISTED TOGETHER

[75] Inventor: Wilfried Baumgarten, Pattensen, Fed. Rep. of Germany

[73] Assignee: Paul Troester Maschinenfabric, Hanover, Fed. Rep. of Germany

[21] Appl. No.: 651,739

[22] Filed: Feb. 7, 1991

[30] Foreign Application Priority Data

Feb. 8, 1990 [DE] Fed. Rep. of Germany ....... 4003735

[51] Int. Cl.⁵ .................. D02G 3/36; N01B 13/22
[52] U.S. Cl. ........................ 57/12; 57/66.5; 57/295; 57/296; 57/297; 156/51; 156/244.12; 254/417; 425/122
[58] Field of Search ............ 156/244.11, 244.12, 156/47, 51; 264/1.5, 174; 226/172, 190, 194; 425/113, 122, 319, 321–322, 391; 57/12, 295–297, 66.5, 334, 344–346; 242/157 R, 157.1; 254/393–395, 417

[56] References Cited

U.S. PATENT DOCUMENTS

| | | |
|---|---|---|
| 1,790,752 | 2/1931 | Kaiser .................. 254/417 |
| 1,849,337 | 3/1932 | Spracher et al. ........... 226/194 |
| 3,005,304 | 10/1961 | Holm ....................... 57/12 |
| 3,537,252 | 11/1970 | Gilmore et al. ............ 57/314 |
| 4,194,873 | 3/1980 | Killmeyer ............. 425/391 X |
| 4,529,564 | 7/1985 | Harlow ............... 264/174 X |
| 4,673,540 | 6/1987 | Portinari ................ 264/1.5 |
| 4,744,935 | 5/1988 | Priaroggia et al. ....... 264/1.5 X |
| 4,997,258 | 3/1991 | Oestreich ............. 264/1.5 X |
| 5,084,221 | 1/1992 | Matsuno et al. ........ 156/244.12 |
| 5,102,584 | 4/1992 | Paivinen et al. .......... 264/1.5 |

FOREIGN PATENT DOCUMENTS 4946183 12/1974 Japan ..................... 156/51
0962174 9/1982 U.S.S.R. ................. 254/417

Primary Examiner—Daniel P. Stodola
Assistant Examiner—William Stryjewski
Attorney, Agent, or Firm—Robert E. Burns; Emmanuel J. Lobato

[57] ABSTRACT

A cable made up of a plurality of conductors twisted together is drawn through the extrusion head of an extruder which applies a sheath of plastic or elastomeric material to the cable. From the extruder, the cable passes through a tube having a heated section in which the sheath material is cured followed by a cooling section. The sheathed cable is rotated about its axis to twist the cable. Guide wheels over which the cable passes have on their circumferences a multiplicity of pairs of rollers which are engaged by the cable and have their axes tangential to the circumference of the wheel so as to support the cable while permitting rotation of the cable about its axis. In one embodiment, a device for drawing the cable from the extruder, while twisting it, has a pair of endless belts which grip the cable between them and a motor for driving the belts. The belts and driving motor are mounted in a motor driven rotatable cage which rotates about the axis of the cable. A device, ahead of the extruder, for braking the cable has a pair of endless belts which grip the cable between them, a brake for the belts and a motor driven rotatable cage in which the endless belts and brake are mounted.

17 Claims, 5 Drawing Sheets

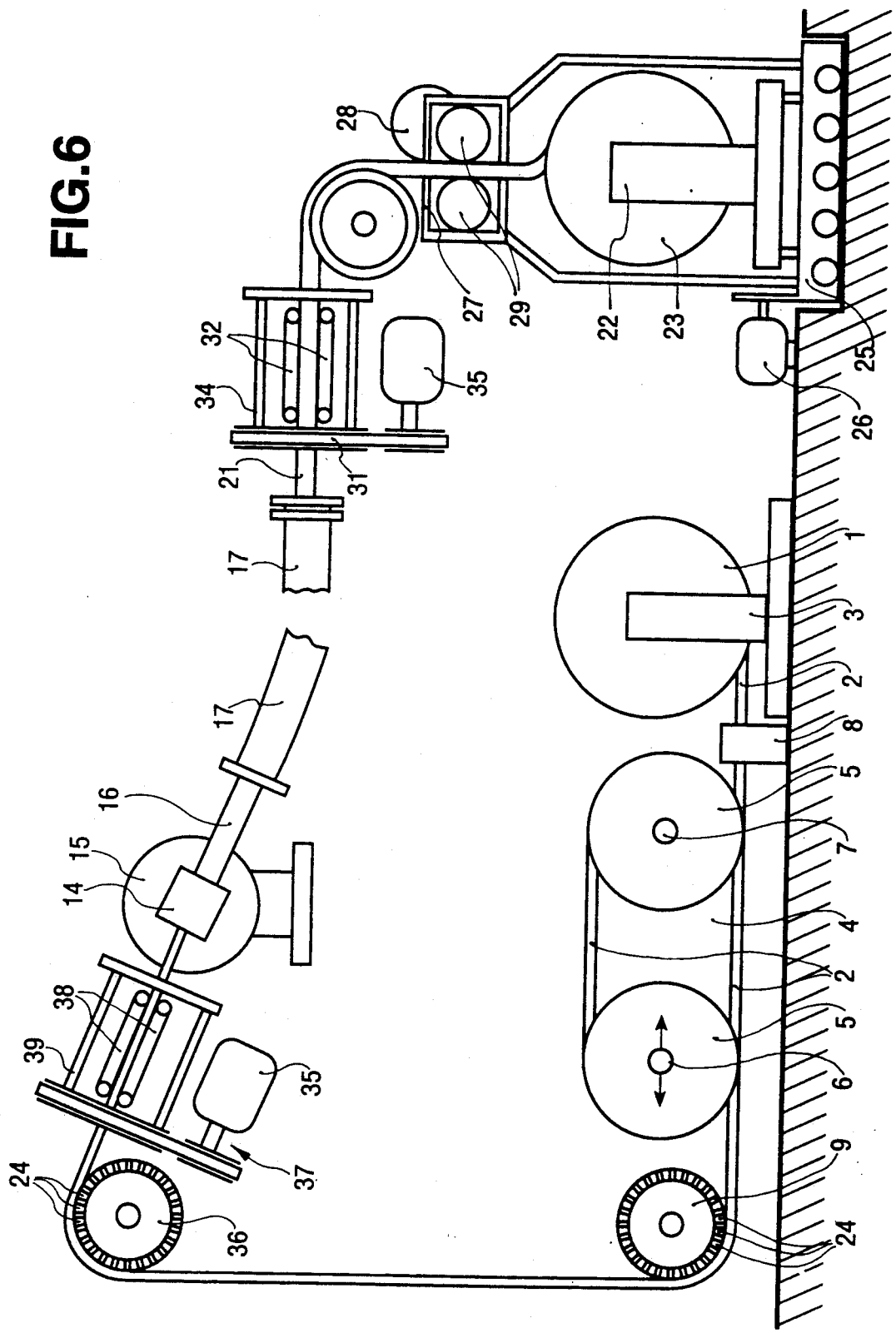

PROCESS AND APPARATUS FOR SHEATHING CABLES FORMED OF A PLURALITY OF CONDUCTORS TWISTED TOGETHER

FIELD OF INVENTION

The invention relates to the sheathing of cables formed of a plurality of conductors twisted together with one or more layers of elastomeric material or polymerizable thermal plastic material as well as their vulcanization and or polymerization, in which the twisted cable is led through extrusion apparatus which applies the sheathing layer or layers and finally the sheathed cable is led through vulcanizing or polymerizing apparatus while being continually rotated about its axis.

BACKGROUND OF THE INVENTION

This manner of procedure in the sheathing of a cable and the final vulcanization or polymerization of the insulating layer of the cable is known through DE-PS 27 26 767 in which the cable during the vulcanization or polymerization process respectively, is rotated about its longitudinal axis by a rotating device which grips the cable sheath. However the rotation is absorbed in a pulling mechanism directly before entrance of the cable into the extruder and does not proceed further.

It is an object of the apparatus of the present invention to prevent the fanning out of the twisted cable during the vulcanization or the polymerization process. Such fanning out would loosen the individual insulated conductors of the cable and the extrusion mass applied as the sheath could enter the interior of the cable and alter the desired cable dimension. Through the applied rotation, this unwinding of the twisted cable is prevented, whereby the twisting applied to the cable only in the region between the rotating device and the pulling device arranged just before the extruder can be developed, whereby the effective twisting produced in the cable by the passage of the cable through the polymerizing tube will be shifted along the axis of the cable, so that neither behind the rotating device in the winding up of the sheathed cable, nor before entry of the twisted, not yet sheathed, cable into the first pulling device, is any untwisting observable. By passage of the cable through the apparatus, the twisting of the cable produced by the rotary movement is shifted along the cable, so that the cable leaves the apparatus rotating device with approximately the same degree of twisting with which the cable entered the apparatus.

This process is, above all, useable where the sheathing to be applied is only a thin layer. With a thin sheathing it is most essential that the least possible sheathing material is pressed into the interior of the cable. If a thicker sheathing is to be applied to an electrical conductor or a conductor bundle, it is necessary to take care that gravity does not deform the still fluid cable sheath after the extrusion, before it is vulcanized or polymerized. Through DE-OS 19 33 043 it is known to compensate the force of gravity on the applied cable sheath by setting the entire apparatus together with the unwinding station of the unsheathed cable and the winding up station of the sheathed cable in rotation about the axis of the cable. This leads to a uniformly sheathed cable, but involves considerable expense and precludes continuous operation, because only the supply of unsheathed cable on a cable drum can be sheathed before the apparatus must be stopped, so that the cable drum can be replaced by a new one.

In the production of a thick walled sheathed cable, the apparatus of DE-PS 27 26 767 cannot be used because the rotary movement serves merely to tighten the twisting of the insulated conductors is not sufficient to prevent deformation of the cable sheath by gravity, while use of the apparatus according to DE-OS 19 33 043 is prohibited on account of the mass to be rotated and the impossibility of continuous operation.

SUMMARY OF THE INVENTION

The invention eliminates the disadvantages of the state of the art. It is the object of the present invention to provide a possibility of effecting thick wall sheathing of cables by the application of extrudant in a continuous operation in which the unsheathed cable remains satisfactorily twisted.

The invention consists therein, that through the guidance of the unsheathed cable, the twisting applied through rotation of the cable before or after the vulcanizing or polymerizing apparatus, extends as free as possible through the extrusion apparatus and guidance devices to, or before, the unwinding station.

In this manner there is obtained the possibility of obtaining a sufficient angle of rotation so as to rotate the viscous applied thick wall sheathing sufficiently that, through the rotary movement, the force of gravity is sufficiently counteracted that a uniformed sheathing thickness is achieved. A sufficient rotary movement is obtained in the manner that, contrary to the aforementioned known process according to DE 27 26 767, the twisting of the cable is first loosened and then again tightened through rotary forces applied to the cable sheath. In this manner there is obtained a satisfactorily twisted cable with a strong, uniformly thick sheath.

The apparatus in accordance with the invention is characterized in that before the extrusion apparatus there is arranged a braking device for the cable and that the braking device applies to the cable a braking force in an axial direction while permitting rotation of the cable about its axis.

Contrary to the drawing apparatus of the state of the art, the apparatus in accordance with the invention uses, directly before the extruder (seen in the direction of the unsheathed cable) a braking device which brakes the cable only in its movement in an axial direction, the rotary movement of the cable about its axis being unopposed. Thus the rotary movement extends through the braking apparatus whereby a guiding device arranged before the braking apparatus effects a loosening of the twisting. There is thus created a sufficient length for the movement of the rotary movement in order for the cable to move through an angle of rotation which is sufficient to counteract gravity forces acting on the still flowable sheath.

It is advantageous when, in advance of the extrusion apparatus, the cable is supported on devices which permit free rotation of the cable about its axis.

Thus it is expedient, through reduction of the friction in rotation of the cable, to facilitate the rotation and its progression, for example when the braking device comprises at least one wheel on the periphery of which there are mounted a plurality of pairs of rollers having their axis arranged tangential to the wheel. Such a braking device effects a braking action only in the axial direction of the cable but permits free rotation of the cable about its axis. Accordingly such device is arranged in advance of the extrusion apparatus (in the direction of advance of the cable).

In order to make possible a continuous operation, there is arranged a storage place where cables on cable drums can be connected with one another without disturbing the production procedure. In this case, the rotary movement extends deep into the storage place but wheels holding the cable on their circumferences are no longer provided with tangentially arranged rollers in order to permit attenuation of the rotary movement in the storage place.

In order to obtain a sufficiently large angle of rotation in the region of the extrusion head, it is expedient to permit the freshly sheathed cable to rotate a plurality of times about its own axis. It can therefore be advantageous to arrange a further rotating device in the region of the brake in order to continue to the supply place the rotation provided by the rotating device down stream of the vulcanizing or polymerizing tube.

It can also be advantageous to provide combined rotating and braking apparatus and combined rotating and drawing apparatus.

An advantageous embodiment of this combined rotating and braking device, or this combined rotating and drawing device comprises a pair of motor driven endless bands which engage the cable and are mounted in a cage which rotates about the cable axis.

In this case it is advantageous when the rotating device gripping the cable downstream of the vulcanization or polymerization tube has a higher rate of rotation than the rotating device arranged ahead of the vulcanization or polymerization tube.

BRIEF DESCRIPTION OF DRAWINGS

The essence of the invention will be described below with reference to the accompanying drawings which schematically illustrate embodiments of the invention, and in which:

FIG. 6, is a schematic side elevation of another embodiment with combined rotating and braking apparatus and combined rotating and drawing apparatus.

DESCRIPTION OF PREFERRED EMBODIMENTS

Figure 1:
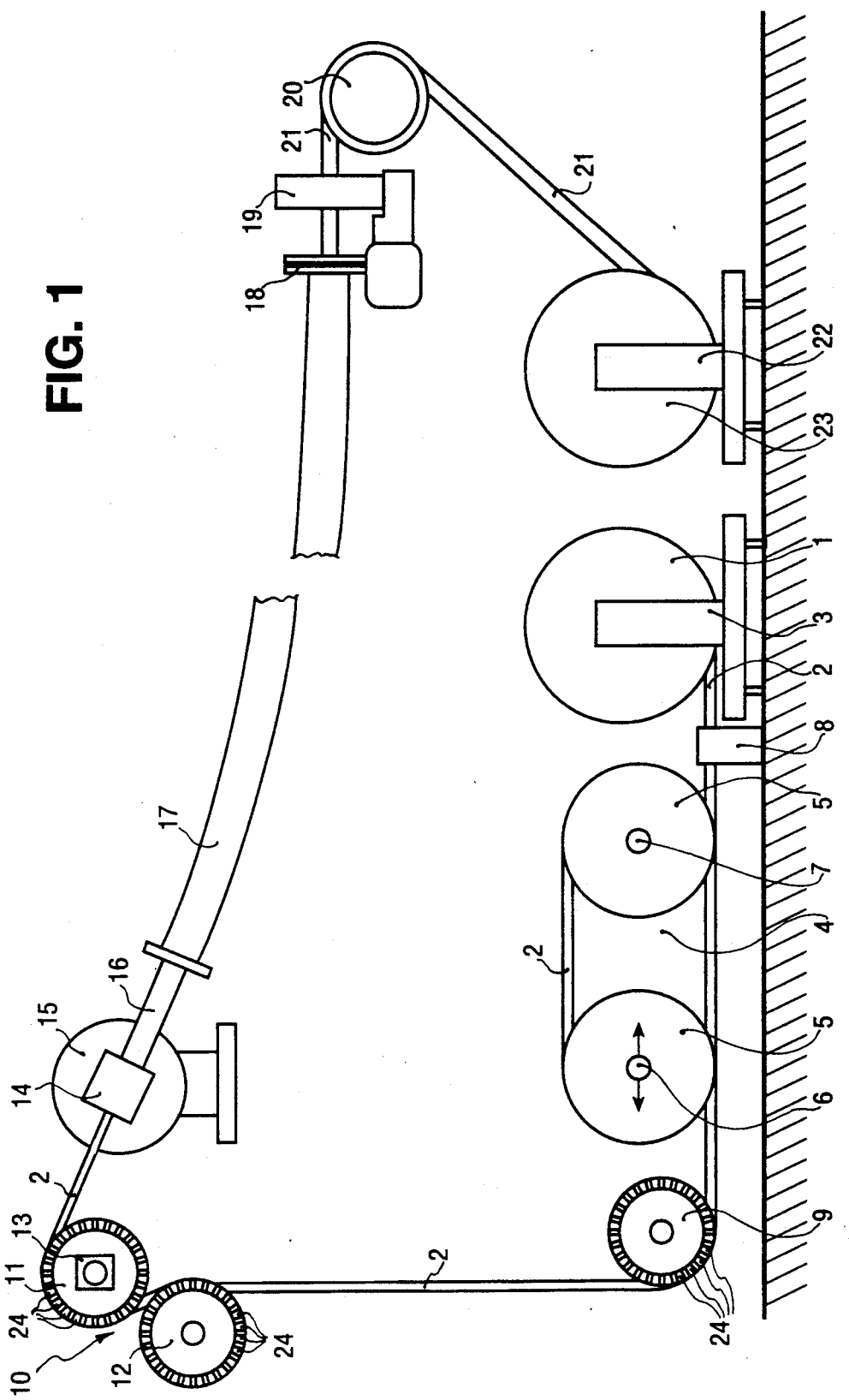
FIG. 1, is a schematic side elevation of the apparatus.
Figure 2:
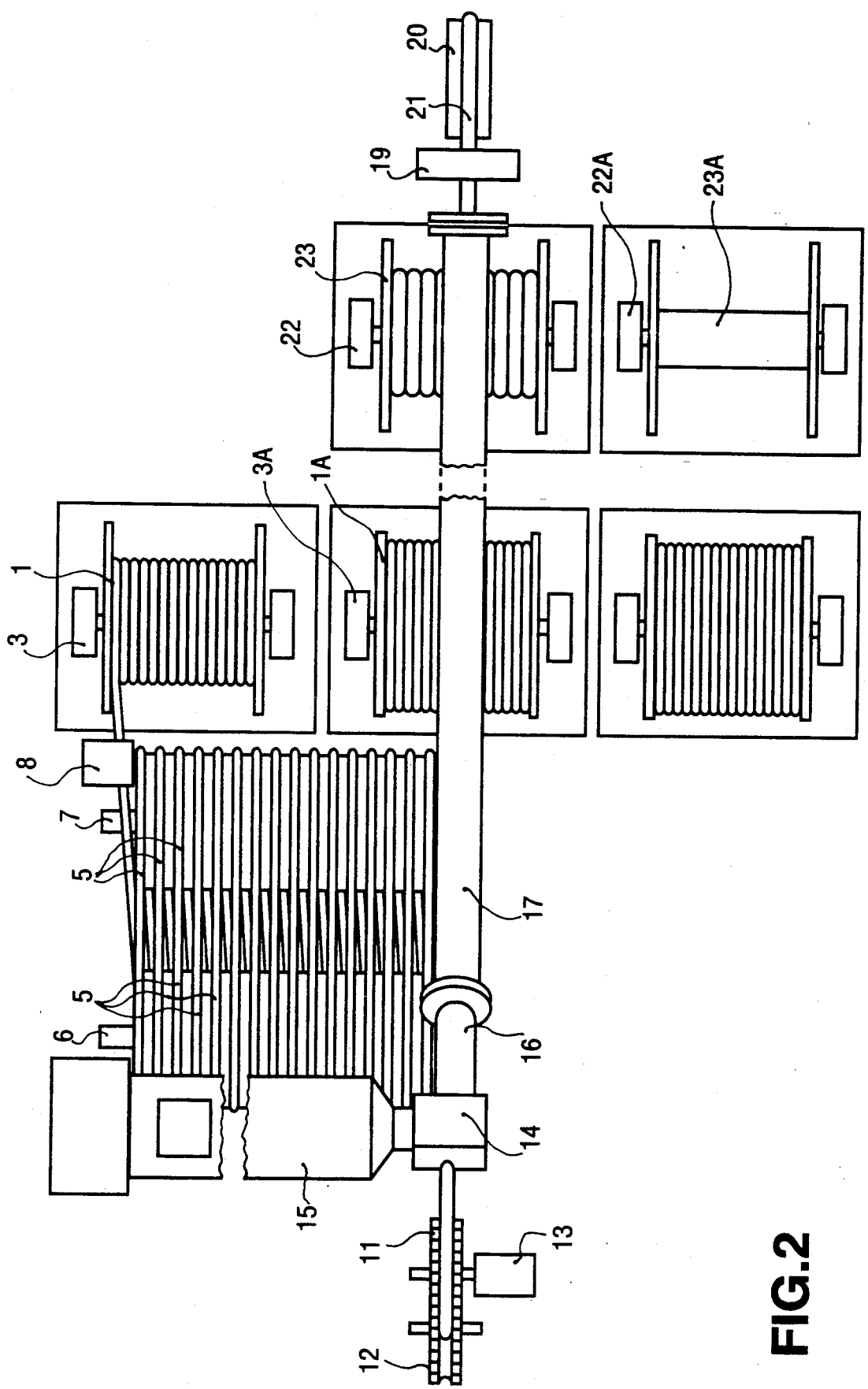
FIG. 2, is a schematic plan view.

A cable drum 1 with an unsheathed cable 2, produced on a twisting machine is positioned on an unwinder 3 which delivers the cable to a storage device 4 of which storage wheels 5 are arranged side by side on two parallel shafts 6, 7, of which the shaft 6 is movable back and forth in the direction of the arrows so as to be nearer the shaft 7 with an empty storage and farther away from the shaft 7 when the storage is full. When, after depletion of the cable supply of a cable drum 1, the cable end leaves the drum, it is held in a connecting station 8, the cable drum 1 together with the unwinder 3 is exchanged with a full cable drum 1A which is already on the unwinder 3A, and the ends of the two cables are joined in the connecting station 8.

After leaving the storage place 4, the cable 2 is led over a guide roll 9 to a brake 10 which, for example, can comprise wheels 11, 12 of which one is provided with controllable braking mechanism. The wheel 11 of the brake 10 serves also as a guide wheel. The cable runs from this guide wheel 11 of the brake 10 into the extrusion head 14 which is fed by one or more extruders 15 with sheathing material for the cable 2. After leaving the extrusion head 14 the, now sheathed, cable runs through a telescopic tube 16 into the vulcanizing or polymerizing tube 17 that, in its interior, has a heating length and a cooling length for a dry or wet treatment of the cable sheath. In this vulcanizing or polymerizing tube the cable hangs free, without touching the walls of the tube 17. Through a sluice 18, the cable, with the now vulcanized or polymerized sheath, leaves the cooling stretch of the tube 17, and runs through a rotating device 19 which grips the cable sheath and imparts to the cable a rotary movement in the direction of the twisting of the individual insulated conductors of the cable. Behind the twisting device 19, there is arranged a drawing device 20 of which the corresponding drive mechanism is controllable and which leads the cable provided with the sheath 21 to a winding-up device 22 which rotates the cable drum 23 on which the drawn cable 2 with its sheath 21 is wound up.

The wheels 11, 12 of the brake 10 as well as the guide wheel 9 are constructed in a particular manner. On their circumferences, these wheels 9, 11 and 12 carry pairs of glide elements or rolls 24 of which the axes are arranged tangential to the respective circumferences of the wheels 9, 11 and 12. The cable lies on these rolls 24. It is thus free to rotate about its axis but is controlled in its axial movement through the speed of rotation of the wheels 9, 11 and 12. Advantageously the guide wheel 9 is allowed to run free while the wheel 11 is provided with a controllable braking device which controls the entrance speed of the cable 2 into the extrusion head 14 and the vulcanizing or the polymerizing tube 17. The wheel 12 serves as a counter wheel to press the cable on the wheel 11 provided with the braking device so that the cable device cannot slip on the wheel 11 of the brake 10.

The rotating device 19 grips the cable sheath 21 and thereby imparts to the entire cable a twist in the direction of the cable twist. This twist continues through the vulcanizing or polymerizing tube 17, through the telescopic tube 16, through the extrusion head 14 of the extruder 15, through the brake 10 with its wheels 11, 12, over the guide roller 9 and ends somewhere in the storage device 4. Through this long distance through which the twist produced by the rotating device 19 extends, it is achieved that the cable in the telescopic tube 16 and in the initial parts of the vulcanizing or polymerizing tube 17 is rotated sufficiently to overcome the tendency of gravity to form the cable into a pear-shaped cross section and retain the still fluid mass in the circular outer contour with which it left the extrusion head of the extruder. The required rate of rotation in the telescopic tube can be attained because this twist can continue all the way to the cable supply 4.

Places of change of direction as they occur on the guide wheel 9 and the brake wheel 10, but also in the cable supply 4, have the disadvantage that at these locations the twisting of the cable is slackened. For the present invention this slackening, considered as an objection in the art, has the advantage that the angle of rotation of each individual cable cross section in the telescope 16 can be greater than without such slackening of the twisting. As the twist of the cable 2 is applied downstream of the vulcanizing or polymerizing tube 17, and as this twist extends to the cable supply 4, the twisting of the individual conductors of the cables in the extrusion head 14 and in the telescope tube 16 is especially tight, because here there is practically no obstacle, between entry of the cable into the extrusion head 14 and the twisting device 19, which opposes the tightening of the twist. The cable can, in some circumstances, rub on the cool part of the tube and must by the rotation overcome the friction forces arising in the sluice 18. The cable will hence be sheathed in an unobjectionable twisted shape in the extrusion head 14 and, after this sheathing, will be turned sufficiently that gravity forces have no influence on deforming the sheathing while this is still not polymerized or vulcanized. In this manner, there is surprisingly produced on the cable core formed by twisted conductors, a thick, precisely formed sheath layer which is vulcanized or polymerized, whereby the cable core is satisfactorily and tightly twisted and lies in the center of the finished product, although on the way from the supply station to the extrusion head there was a loosening of the twisting.

Thereby it can be advantageous when the rotating device and the drawing device are formed as a unit whereby the rotating device which grips the cable sheath also acts on the cable in a drawing direction. This is realized through the rotating device 19 in FIG. 1.

In the experimental works, a particular problem has crystallized. The rotating device 19 exerts on the cable a twisting not only in the direction toward the unwinding drum, but also in a direction of the winding up drum of the cable. It turned out that the sheathed cable was not wound up stress free on the cable drum, but had a considerable rotation against the twist direction. With some cables it was determined that the sheathed cables wound on the cable drum had in their interior partial fanning out of the conductors.

Figure 3:
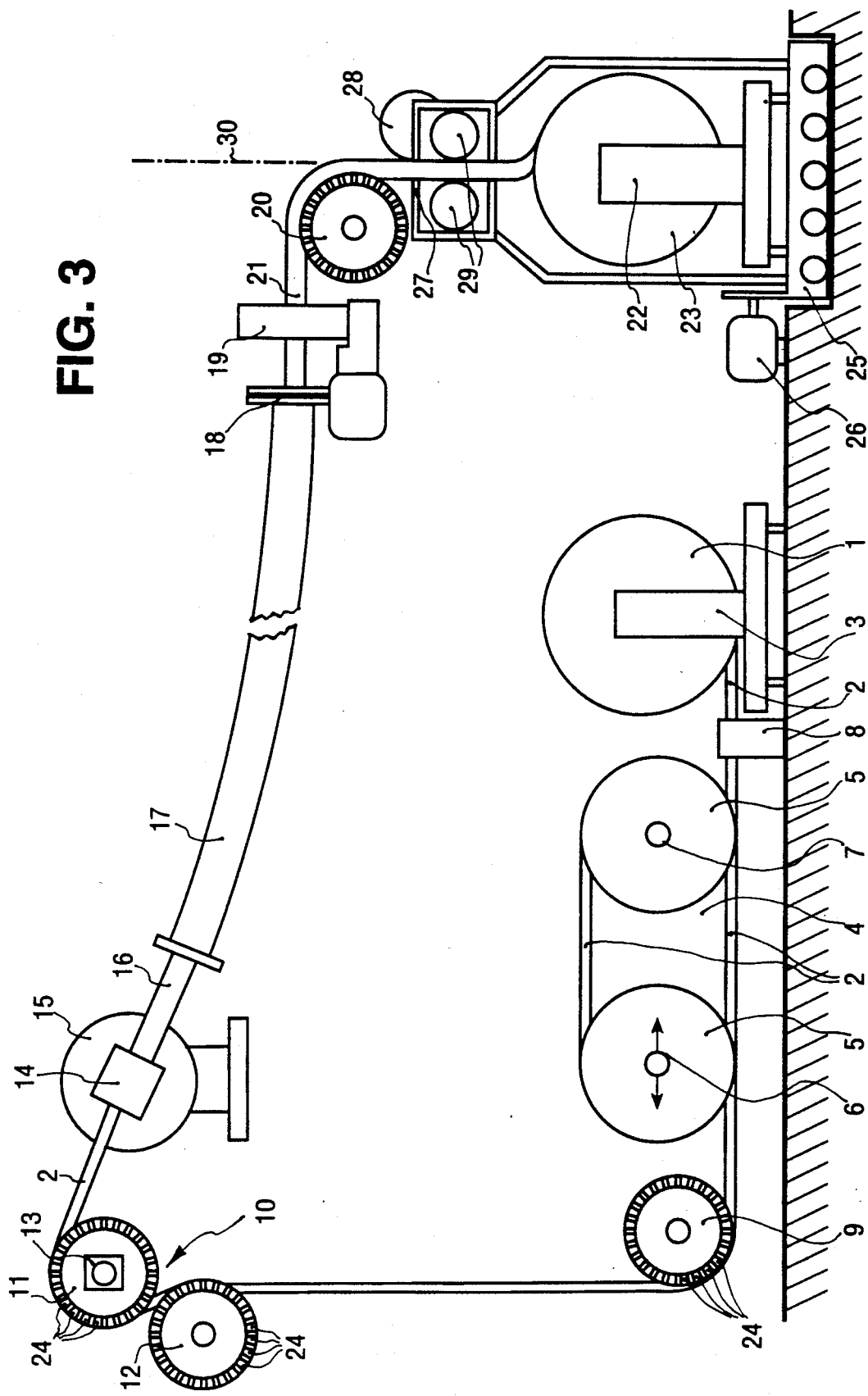
FIG. 3, is a schematic side elevation of an alternative embodiment.
Figure 5:
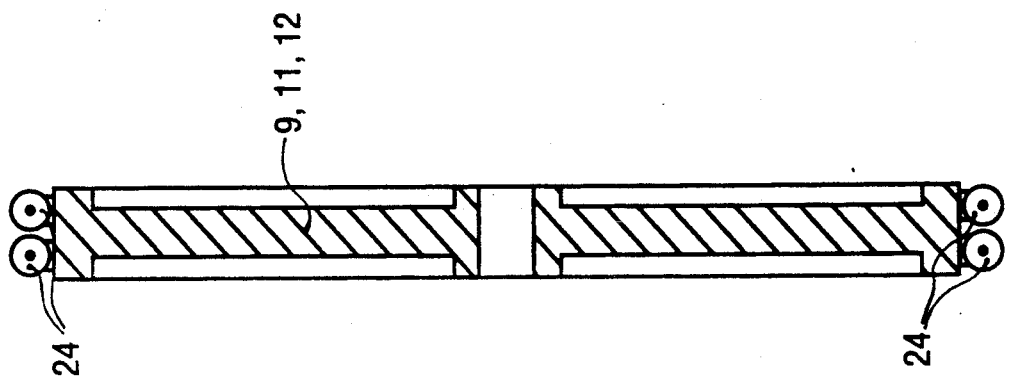
FIG. 5, is a cross section of the brake wheel.
Figure 4:
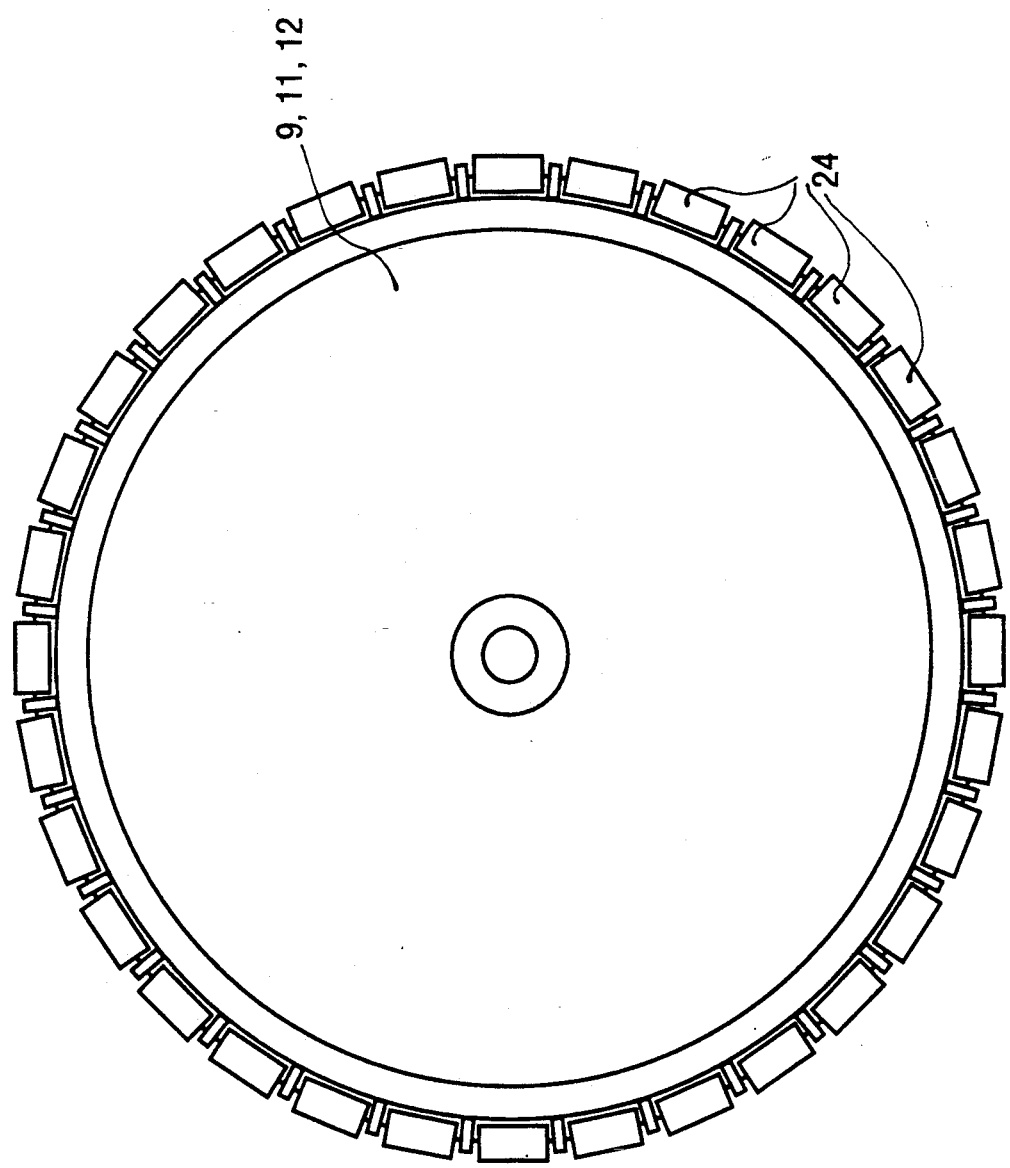
FIG. 4, is a side elevation of the brake.

This objection was overcome by the alternative embodiment of the apparatus shown in FIG. 3. Here the cable drum 23 serving for winding up the sheathed cable 2, 21 is mounted, together with its drive 26, on a rotating table 25, whereby the cable lead 27 is arranged vertically in the axis of rotation of the rotating table. The rotating table is rotated by a variable speed motor 28, the speed of which is coordinated with the rotating device 19 of the cable.

It can be advantageous when the drawing device 29 for the cable 2, 21 is likewise arranged on the rotating table 25 preferably over the cable drum 23 and preferably concentric with the axis 30 of the rotating table.

It is further advantageous when also the guide wheel 20, following rotating apparatus 19 is provided with pairs of rollers 24 on its circumference with the axes of the rollers tangential to the circumference of the guide wheel 20.

In the embodiment of FIG. 6, a combined rotating and pulling device 31 is arranged downstream of the vulcanizing or polymerizing tube 17. The device 21 comprises two motor driven endless bands 32 which grip the cable sheath 21 between them and which are arranged in a rotating cage 34 which rotates about the axis of the cable. This cage is rotated by a motor 35.

In this embodiment, there is arranged behind the guide wheel 36, ahead of the extrusion head 14, a further rotating device 37 which is combined with the braking device. This rotating and braking device 37 comprises two endless bands 38 which grip the cable 2 between them and which are arranged in a rotating cage 39 driven by a further motor 35. With this construction of the apparatus an especially wide angle of rotation can be imparted to the cable.

What I claim is:

1. Apparatus for sheathing a cable, formed of a plurality of conductors twisted together, with a layer of sheathing material selected from the group consisting of elastomeric material and plastic material, said apparatus comprising, an extruder for extruding a covering layer of sheathing material onto said cable, cable supplying means for supplying an unsheathed twisted cable to said extruder, curing means of downstream of said extruder for curing said layer of sheathing material, drawing means downstream of said curing means for drawing the sheathed cable from said curing means, and twisting means downstream of said curing means for rotating said sheathed cable about its axis to apply a twist to the sheathed cable, said cable supplying means including braking means upstream of said extruder for braking said twisted cable in a lengthwise direction while permitting free rotary movement of said cable about its axis, said braking means comprising a rotatable wheel over which said cable runs, means for braking said wheel and means for supporting said cable on the periphery of said wheel for movement of said cable circumferentially with said wheel and for free rotation of said cable about its axis.

2. Apparatus according to claim 1, in which said rotatable wheel over which said cable runs, on its periphery a multiplicity of pairs of rotatable rollers having fixed axes disposed tangentially of said wheel.

3. Apparatus according to claim 1, in which said cable supplying means comprises a plurality of rollers on each of two shafts which are disposed parallel to one another and are movable toward and away from one another.

4. Apparatus according to claim 1, in which said cable supplying means further comprises drum supporting means for supporting side-by-side a plurality of drums of unsheathed cable to be supplied to said extruder and a connecting station between said drum supporting means and said extruder for connecting a trailing end of a cable from one drum to a leading end of a cable from another drum.

5. Apparatus according to claim 1, in which said drawing means and said twisting means for rotating said sheathed cable about its axis are combined as a unit.

6. Apparatus according to claim 5, in which said combined drawing and twisting means comprises two opposed endless belts which grip said cable between them, means for driving said endless belts to apply a draft to said cable, a rotatable cage in which said endless belts and said driving means are disposed and means for rotating said cage.

7. Apparatus according to claim 1, in which said drawings means for drawing said sheathed cable from said curing means is arranged down stream of said twisting means for rotating said sheathed cable and is disposed on a rotating table.

8. Apparatus according to claim 7, further comprising a drum for winding up sheathed cable from said drawing means, said drum being disposed on said rotating table.

9. Apparatus according to claim 8, in which said drawing means is disposed above said drum and coaxially with the axis of rotation of said rotating table.

10. Apparatus according to claim 1, further comprising additional twisting means for rotating said cable to apply a twist thereto, said additional twisting means being disposed adjacent said braking means.

11. Apparatus according to claim 10, in which said twisting means downstream of said curing means rotates said cable at a higher rate than does said cable rotating means disposed adjacent said braking means.

12. Apparatus according to claim 10, in which said additional twisting means for rotating said cable is combined with said braking means as a unit.

13. Apparatus according to claim 12, in which said combined twisting and braking means comprises two opposed endless belts which grip the cable between them, a rotatable cage in which said opposed endless belts are arranged and means for rotating said cage.

14. Apparatus for sheathing a cable, formed of a plurality of conductors twisted together, with a layer of sheathing material selected from the group consisting of elastomeric material and plastic material, said apparatus comprising,
   an extruder for extruding a covering layer of sheathing material onto said cable,
   cable supplying means for supplying an unsheathed twisted cable to said extruder,
   curing means downstream of said extruder for curing said layer of sheathing material,
   drawing means downstream of said curing means for drawing the sheathed cable from said curing means, and
   twisting means downstream of said curing means for rotating said sheathed cable about its axis to apply a twist to the sheathed cable,
   said cable supplying means including braking means upstream of said extruder for braking said twisted cable in a lengthwise direction while permitting free rotary movement of said cable about its axis.
   said cable supplying means further comprising means for guiding an unsheathed cable to said extruder, said guiding means comprising a rotatable wheel having on its periphery a multiplicity of pairs of rollers engaged by said cable, said rollers having fixed axes disposed tangentially of said wheel.

15. Apparatus for sheathing a cable, formed of conductors twisted together, with a layer of sheathing material selected from the group consisting of elastomeric material and plastic material, said apparatus comprising,
   an extruder for extruding a covering layer of sheathing material onto said cable,
   cable supplying means for supplying an unsheathed twisted cable to said extruder,
   curing means downstream of said extruder for curing said layer of sheathing material,
   drawing means downstream of said curing means for drawing the sheathed cable from said curing means, and
   twisting means downstream of said curing means for rotating said sheathed cable about its axis to apply a twist to the sheathed cable,
   said cable supplying means including braking means upstream of said extruder for braking said twisted cable in a lengthwise direction while permitting free rotary movement of said cable about its axis,
   further comprising a rotatable guide wheel between said drawing means and said curing means, said guide wheel having on its periphery a multiplicity of pairs of roller which are engaged by said cable and which have fixed axes disposed tangentially of the circumference of said guide wheel.

16. In apparatus for sheathing a cable, formed of a plurality of conductors twisted together, with a layer of sheathing material selected from the group consisting of elastomeric material and plastic material, said apparatus comprising an extruder for extruding a covering layer of said sheathing material onto said cable, cable supplying means for supplying an unsheathed twisted cable to said extruder, drawing means for drawing the sheathed cable from said extruder, curing means between said extruder and said drawing means for curing the sheathing material applied to said cable by said extruder and twisting means downstream of said curing means for rotating the sheathed cable about its axis to twist said cable, the improvement which consists in that,
   said cable supplying means for supplying an unsheathed cable to said extruder includes a rotatable wheel over which said cable runs, said wheel having on its circumference a multiplicity of pairs of rollers engaged by said cable, said rollers having fixed axes disposed tangentially to said wheel.

17. Apparatus according to claim 16, in which said wheel is disposed just ahead of said extruder and in which means is provided for braking said wheel to apply a braking force to said cable while permitting rotation of said cable about its axis.

* * * * *